INVENTORS.
Dietrich Jentzsch
Klaus Kuhne
BY
ATTORNEY

United States Patent Office 3,390,513
Patented July 2, 1968

3,390,513
PREPARATIVE GAS CHROMATOGRAPHIC
APPARATUS
Dietrich Jentzsch and Klaus Kuhne, Uberlingen (Bodensee), Germany, assignors to Bodenseewerk Perkin-Elmer & Co. GmbH, Uberlingen (Bodensee), Germany
Filed Oct. 11, 1966, Ser. No. 585,790
Claims priority, application Germany, Oct. 14, 1965,
B 84,109
4 Claims. (Cl. 55—197)

ABSTRACT OF THE DISCLOSURE

A preparative chromatograph includes collection means having a cold trap for collecting separated components of a sample which elute from a column of the chromatograph. The trap comprises an enclosed body having head and collecting members and wherein said head member includes inlet and outlet ports. Said members are arranged in a gas-tight, separable relationship and define a carrier gas flow path between the inlet and outlet ports. A gas permeable screen is arranged as an annular, elongated body which is closed at one end thereof and which is coupled to the outlet port. Fog forming substances and fatty acid methylester and terpenes are thus advantageously collected with a relatively non-complex and inexpensive apparatus.

---

Figure 1:
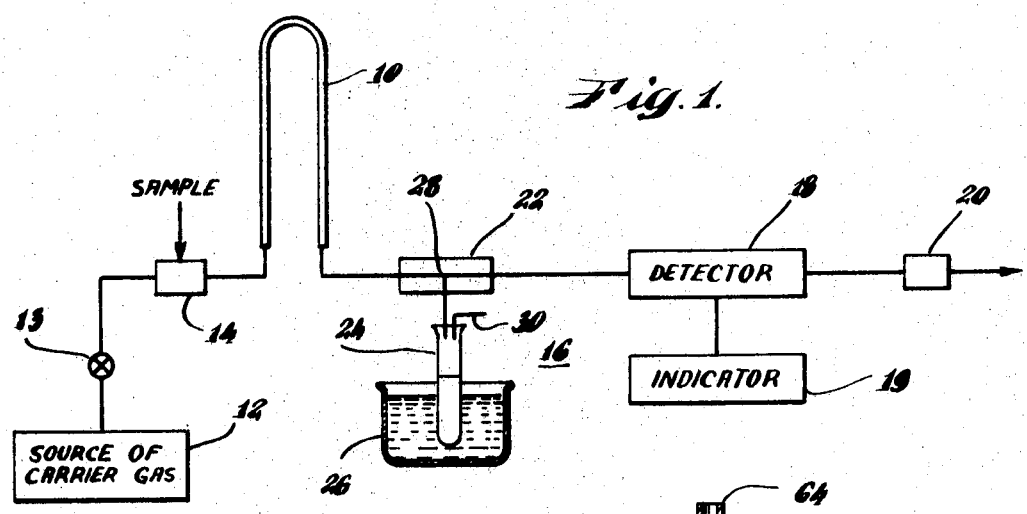

This invention relates to chromatographic apparatus and more particularly to improvements in preparative gas chromatographic apparatus.

As is well known, preparative gas chromatographic apparatus are instruments adapted for separating one or more components of a sample and for collecting the separated components in a form suitable for further analysis by the analytical chemist. In a known arrangement for providing this fraction, a vaporized sample is injected into a carrier gas stream and carried through a separating column of the apparatus. Vaporized components of the sample which elute successively in time from the column are conducted to a collecting means which includes a vessel commonly referred to as a trap. The trap is operated at a temperature suitable for causing condensation of a desired component of a vaporized sample. A plurality of separate traps may be provided to accommodate the different sample components or alternatively a single trap may be utilized. In the latter case, the trap is replaced as each component elutes.

A known form of trap includes inlet and outlet ports for providing a flow-through path for the carrier gas. Means maintain the trap at a temperature equal to or lower than the temperature of condensation of the vaporized sample component. The component therefore condenses and collects in a lower portion of the trap while the carrier gas exhausts through the outlet port.

In prior art trap arrangements of this type, it has not been possible to suitably collect certain sample components. For example, fog or smoke-forming substances such as fatty acid methylester or terpenes as well as high melting substances have been difficult to collect.

Accordingly, it is an object of this invention to provide an improved form of preparative gas chromatographic apparatus.

Another object of the invention is to provide an improved flow trap for use with preparative chromatographic apparatus.

A further object of the invention is to provide a trap adapted for collecting fog or smoke-forming substances including fatty acid methylester and terpenes.

Another object of the invention is to provide a trap adapted for collecting high melting substances.

Still another object of the invention is to provide an improved form of flow through trap having inlet and outlet ports positioned in an upper portion of the trap.

In accordance with a feature of the present invention, a preparative gas chromatograph includes a separating means for separating a vaporized sample into components and for conducting a vaporized separated component to a trap having a portion thereof operating at or below the condensation temperature of the separated component. The trap comprises an enclosed body formed of separable, sealed, head and collecting members. The head member includes inlet and outlet ports which are separated by an annular, elongated gas-permeable member depending from the outlet port into the trap body. By this arrangement, the flow path of the carrier gas extends through the gas-permeable member and the collecting characteristics of the trap are thereby enhanced.

Figure 2:
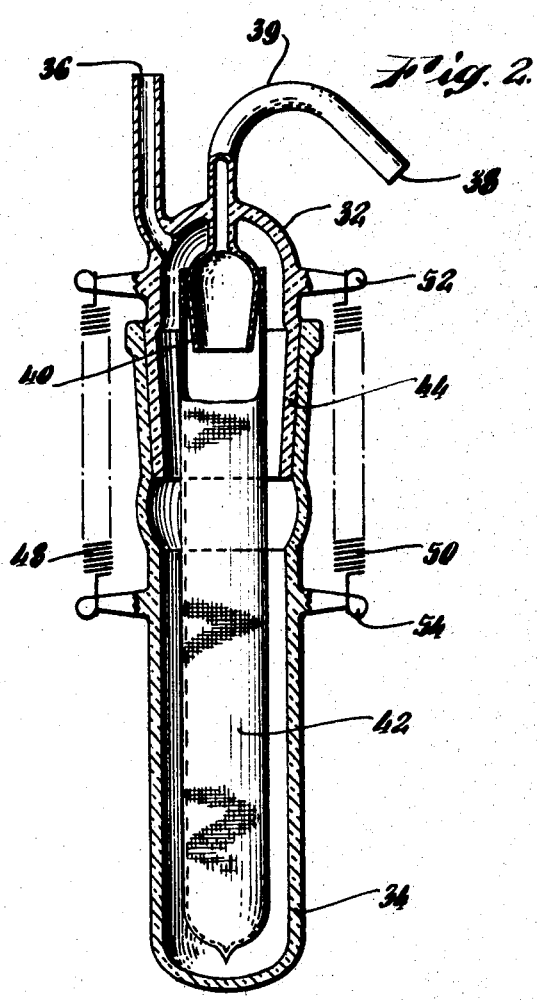
Figure 3:
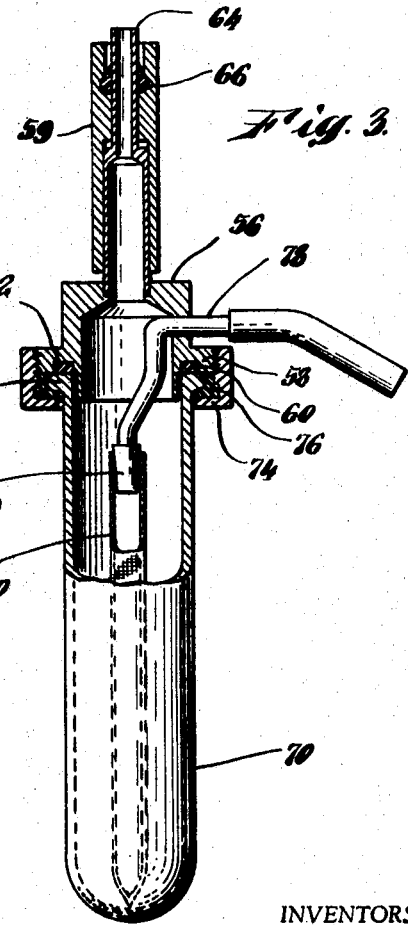

These and other objects of the invention will become apparent with reference to the following specification and drawings wherein:

FIGURE 1 is a block diagram illustrating the general arrangement of the preparative gas chromatographic apparatus employing the present invention, FIGURE 2 is an elevation view of a cold trap in section form, illustrating one embodiment of the invention, and FIGURE 3 is an elevation view, partly in section, of a cold trap illustrating another embodiment of the present invention.

A general arrangement of a preparative gas chromatographic instrument is illustrated in FIGURE 1 and will be described briefly. The arrangement shown includes a separating column 10, a source 12 of a carrier gas for carrying a multi-component sample through the separating column, a carrier gas flow rate regulator 13, a sample injector 14 for injecting a vaporized sample into the carrier stream, a sample component collection means indicated generally as 16, a sample detector 18, and a flow stream split restrictor 20. Collection means 16 comprises a heated fraction collector 22, a trap 24 and means 26 for cooling the trap. Alternatively, a plurality of traps may be employed in which case the collector 22 would operate as a heated distributor. Although the cooling means shown comprises a Dewar flask containing a refrigerant, other conventional cooling arrangements such as a refrigerating coil or a cooling chamber can be employed. Various tubulations intercouple the components as shown for conducting the carrier gas through the column to the detector and trap.

The carrier gas flow rate is established at some desired value by the regulator 13 and carrier gas flow divides at a T fitting 28 in proportion to a flow constriction provided by the flow constrictor 20. Carrier gas flows to the trap 24 and exhausts to atmosphere at an output port and tubulation 30. Carrier gas also flows to the detector 18 and exhausts to the atmosphere through constrictor 20. The sample is introduced to the carrier stream in vaporized form by the injector 14 which is generally heated to assure that the sample is fully vaporized. Components of the sample are separated by, and, elute successively in time from the column 10.

The separated components are individually collected by conducting the vaporized sample to a trap 24 wherein a portion of the carrier gas flow path is maintained at or below the temperature of condensation of the sample component being collected by the refrigerant means 26. Thus, the sample component collects in a trap while the carrier gas is exhausted through outlet port and tubulation 30. In order to assure that the separated components being eluated by column 10 exist in a vaporized state, the fraction collector 22 is maintained at an elevated temperature by heating means, not illustrated. In addition, it is also desirable at times to maintain the various tubulations at elevated temperatures in order to assure existence of the separated component in the vaporized state.

Detector 18 operates to provide for the instrument operator, an indication of the initiation and termination of collection of a sample component in the traps. Detector 18 comprises a conventional flame ionization detector which generates an electrical output signal during the flow of the separated component throughout the detector. The output signal is coupled to an indicator 19 such as a chart recorder. Initiation and termination of the output signal, which can be viewed on the chart recorder 19, indicates that a component of the sample has been condensed and is collected in the trap 24. The contents of the trap 24 are then removed prior to the occurrence of elution of a successive component of the sample. Alternatively, a plurality of traps may be arranged with automatic carrier gas switching means for coupling the carrier gas and eluted components to different traps.

As previously indicated, prior carrier gas flow-through traps have exhibited limited collection characteristics with respect to certain components such as fog or smoke-forming substances. Referring now to FIGURE 2, a trap constructed in accordance with the present invention is illustrated in detail and comprises an enclosed, flow-through, collection body formed of separable head and collecting members 32 and 34 respectively. The head member 32 includes an inlet port 36 and an outlet port 38. The outlet port communicates through a gas flow passage 39 with a frusto conically shaped support member 40 which is shown to be integral with and depending from a central portion of the head member. This member extends into the enclosed volume of the trap. An elongated, annular, hollow, carrier gas-permeable element 42 is formed as a mesh or gauze from material such as metal wire or glass silk and, which is closed at a lower end thereof, is supported from the member 40 and extends into the collecting member 34. A suitable metallic gauze can be formed from 200 mesh material, for example. When employing glass fiber meshing, commercial glass fiber insulating hoses are utilized having the same outer dimensions as the metallic sieve. The dimensions of the bodies 34 and 40 are arranged to provide a snug, slip-on but removable fit therebetween.

Sample components which collect in member 34 are removed by separating the head and collecting members. The head member 32 tapers conically inward at a lower portion 44 and slideably mates with the collecting member which tapers conically outward at an upper portion. Springs 48 and 50 are coupled between bosses 52 and 54 and secure the head and collecting members together in a gas-tight union. Additionally, various gaskets and sealing arrangements may be provided to maintain a leak proof union when necessary. The head and collection members can thus be separated for removal of the separated component. In operation, the collecting member is maintained at a relatively cool temperature, for example, by positioning in the refrigerant, as shown in FIGURE 1, and the outlet port is coupled to the fraction collector or distributor by suitable tubing.

The trap arrangement of FIGURE 2 is particularly advantageous in that it promotes the separation of substances previously difficult to separate. The carrier gas-permeable body 42 is disposed in the path of the gas and gas exhaust can only be accomplished by passage through the body 42. The flow of a vaporized sample component into the relatively cool trap causes separation of the substances and they accumulate in solid or liquid form. They are deposited on the cooled body 42 and form thereon a filtering layer of crystals of the solidifying substance which in turn further promotes the separation of successive portions of the component. A "self-filtering" effect is thereby produced.

FIGURE 3 illustrates an embodiment of the present invention which is adapted for providing improved separation of high melting substances. In order to avoid a premature condensation of the high melting substances in coupling and inlet passages to the head, the inlet head member 56 is coupled to the heated fraction collector 22 or distributor in a manner for reducing the magnitude of a temperature difference which could exist between the head and collector or distributor.

The head member may be demountably or permanently mounted to the collector 22 or distributor. A demountable head assembly may comprise a screw fitting on a segment of the head which mates with a similar fitting on the collector 22 or distributor. Alternatively, a gas-tight press fit may be employed. In FIGURE 3, the head member 56 is press fitted to an outlet line 64 of the collector 22 or distributor. The outlet line 64 is soldered to a tubular member 59. The head member 56 includes an integral flange 58 which along with a wall portion of the head member forms an annular groove 62 in which a sealing ring 60 is positioned.

A collecting member 70 is provided with an annular flange 72 on an upper extremity extending away from a center line of the member and which abuts against the sealing ring 60. This flange is forced against the sealing ring 60 by a retaining nut 74 having a centrally located aperture through which the collecting member 70 extends. An annular elastic seal 76 is interposed between the nut and with flanges 58 and 72. The nut and the seals are therefore adapted for securing the collecting member to the head member in a gas-tight relationship.

An exhaust tubulation 78 is secured to the head member 56 and a portion thereof depends into the collecting member 70 and terminates in a frusto conically shaped support member 79. An annular, elongated, gas-permeable body 80, which is closed at one end and formed of a fine mesh metal or glass silk such as gauze, as described hereinbefore with respect to FIGURE 2, is supported from the body 79. The dimensions of the body 79 and the body 80 are adapted to provide a snug slip-on and removable fit therebetween.

In furtherance of the advantageous separation characteristics, the dimensions of the trap are arranged for providing that the flow velocity in the trap is reduced substantially. In one arrangement which is not deemed to limit the scope of this invention in any respect, the cross sectional area of the gas supply line from the collector 22 or distributor was on the order of 12.6 mm.² and an annular cross sectional area between the annular, elongated, gas-permeable body and the trap collecting member was 350 mm.². From these figures it can be computed that the linear velocity is reduced by a factor greater than 100. The volume of the collecting member defined by this annular area is 50 cm.³.

The following examples describe separation arrangements embodying the present invention. These arrangements are exemplary and not deemed to limit the scope of the present invention in any respect.

(1) In an arrangement for the control of the separation of fog-forming substances in an automatic cyclic operation, the following apparatus provided successful separation of fatty acid methylester.

Apparatus: Bodenseewerk Perkin-Elmer & Co., GmbH model F–21 preparative gas chromatograph Columns:
    3x Type 8P6.16 ($\phi_a$ ⅜″, 52 on Celite 60–100 mesh),
    +2x Type 8P5.12 ($\phi_a$ ⅜″, 5% SE 52 on Celite 60–100 mesh),
    Column temperature=482° F.
    Injection block, distributor and connection pipe temperature=572° F.

Nitrogen carrier gas adjusted to a flow of 200 ml./min.
Detector—flame ionization detector
Flow divider—40:1

Sample—a total of 900 ml. with a 30% methanolic solution of palmitic acid methylester corresponding to a charge of 270 mg. ester.

The trap was halfway immersed in a cooling bath at 158° F. to permit the ester to accumulate in solid form. The major quantity of the solid ester was separated as the metal sieve and part of the substance was deposited on the bottom of the collecting vessel in the form of flakes. A liquid control manometer coupled between the distributor and traps and which permits the measurement of pressure in the trap indicated no pressure rise resulting from the separation. The pressure in the trap was 25 mm. column of water. No fog was observed at the outlet of the trap and a 95% yield related to the quantity used, was detected. The same success was provided both with a metal sieve body and fiber mesh body in the trap.

A comparative test employing conventional collecting traps having a cooling path and a collecting vessel provided zero yield since the fog-forming ester did not separate.

(2) In an arrangement for cyclic-automatic operation with separation and fraction cutting:

Apparatus: same as Example 1
Columns: 2x Type 8P43.03 (20% "Apiezon" fat on "Chromosorb" R, 60–80 mesh)
A nitrogen carrier flow was adjusted to 420 ml./min.

A methanolic solution with 15% palmitic and stearic acid methylester each was dosed 50× through 38.3 hours. The dosed quantity of solution was 18 ml., per cycle 0.054 ml. of each component was fed. With the use of the same collecting trap as Example 1, neither fog nor a clogging was detected. In addition, the pressure in the traps did not rise regardless of the separation of the solid ester on the metal sieve.

(3) A trap in accordance with FIGURE 3 was employed in the following arrangements:

Apparatus: Bodenseewerk Perkin-Elmer & Co., GmbH Model F–21, preparative gas chromatograph
Columns: 3x Type 8P5.16 ($\phi_a$ ⅜", 5% SE 52 on Celite 60–100 mesh)
A nitrogen carrier gas was adjusted to a flow of 200 ml./min.
Flow divider—40:1
Column temperature—320° F.
Injector block temperature=608° F.
Connection pipe temperature=572° F.
Distributor temperature=734° F.

In an automatic-cyclic mode of operation through 37 hours with 70 cycles in one trap each 110 mg. azonaphthene and 100 mg. fluorene were collected, with no clogging of the line or pressure rise being observed.

Thus, a preparative chromatograph has been described having an improved form of trap which is adapted for collecting substances such as fog and smoke-forming substances and high melting substances, previously difficult to collect.

While we have illustrated and described particular embodiments of our invention, it will be understood that various modifications may be made therein without departing from the spirit of the invention and the scope of the appended claims.

What is claimed is:

1. In a preparative gas chromatograph having column means for separating vaporized components of a sample and means for collecting components of the sample, said sample having at least one component characterized by the formation of an aerosol thereof upon cooling after separation, an improved cold trap for collecting said component comprising:

an enclosed elongated body having a head and a collecting member, said body having a substantially greater length than width, said head member including an inlet port and an outlet port;
a support member within said body communicating with said inlet port;
said head and collecting members being arranged in a gas-tight relationship and including means for releasably connecting the members, said head and collecting members defining a carrier gas flow path between said inlet and outlets ports;
means coupled to said inlet port for introducing an aerosol-forming component to said enclosed body;
a gas permeable screen formed as an annular, elongated body closed at one end thereof and having an opposite end coupled to said support member whereby said carrier gas flow path extends through said screen, said screen having a length substantially greater than its width and spaced from the body walls, said screen coupled to said support member and extending longitudinally into said collecting member; and
means externally positioned with respect to said enclosed body for cooling said collecting member.

2. The apparatus of claim 1 wherein said gas permeable screen is formed of a glass silk.

3. The apparatus of claim 1 including heated collection means for maintaining eluted vaporized components in a vapor state and wherein said head member is coupled to said collection means for heating thereby.

4. The apparatus of claim 1 wherein said gas-permeable screen and said enclosed trap body are adapted for decreasing the velocity of carrier gas by at least a factor of 100.

References Cited

UNITED STATES PATENTS

| | | | |
|---|---|---|---|
| 2,831,549 | 4/1958 | Alpert | 62—40 X |
| 3,216,207 | 11/1965 | Boyer et al. | 62—42 |
| 3,225,521 | 12/1965 | Burow | 55—197 X |
| 3,264,832 | 8/1966 | Van Der Ster et al. | 62—42 |
| 3,341,732 | 9/1967 | Malvin et al. | 55—386 |

REUBEN FRIEDMAN, *Primary Examiner.*

J. L. DE CESARE, *Assistant Examiner.*